March 11, 1930.  J. G. LE PERE  1,749,916
CORN POPPER
Original Filed Jan. 6, 1925
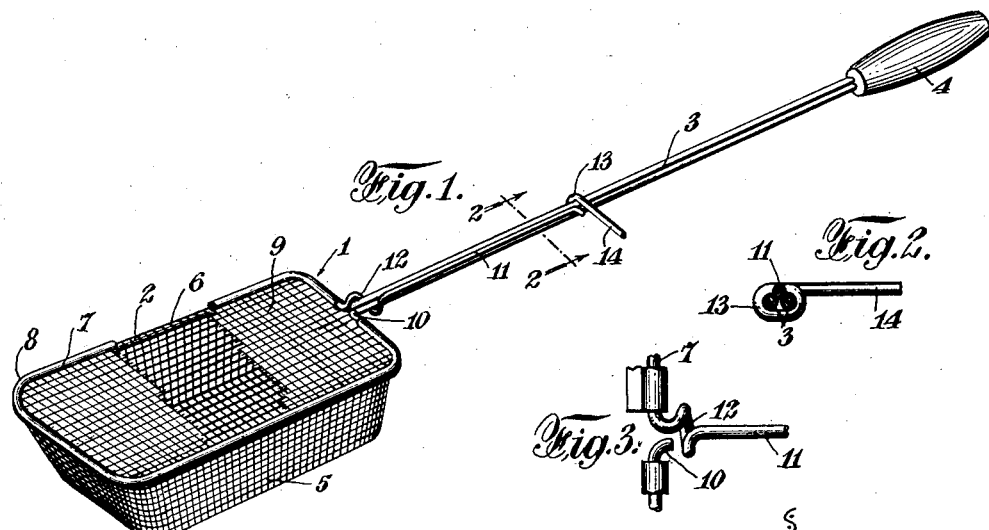
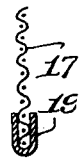
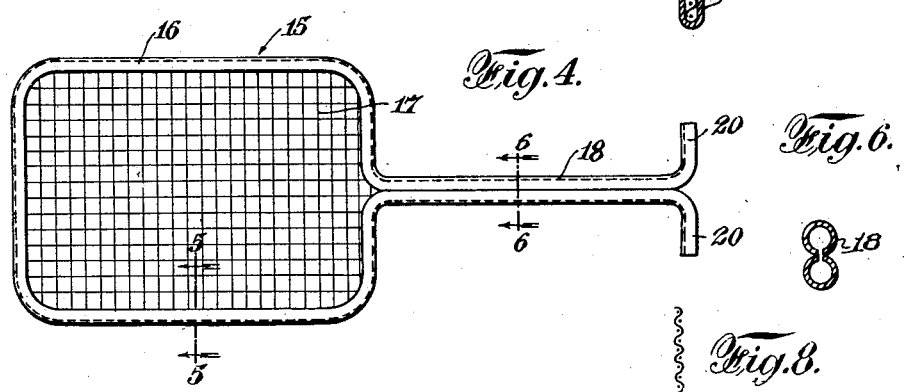
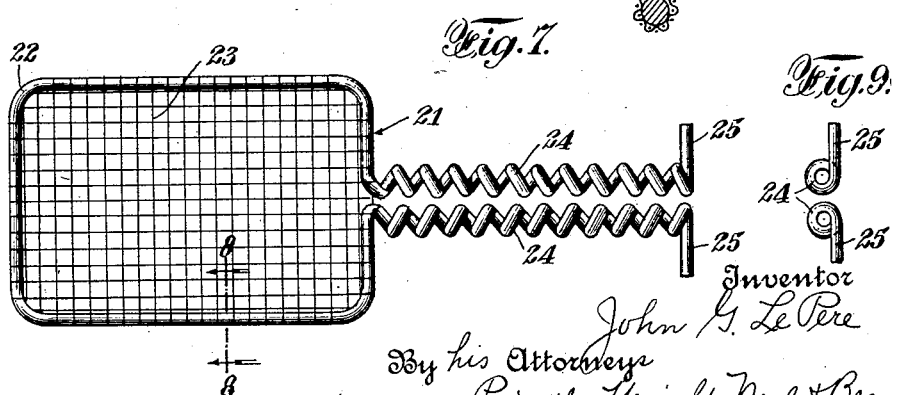
Inventor
John G. Le Pere
By his Attorneys
Prindle, Wright, Neal & Bean Patented Mar. 11, 1930

1,749,916

UNITED STATES PATENT OFFICE

JOHN G. LE PERE, OF DECATUR, ILLINOIS, ASSIGNOR TO U. S. MANUFACTURING CORPORATION, OF DECATUR, ILLINOIS, A CORPORATION OF ILLINOIS

CORN POPPER

Original application filed January 6, 1925, Serial No. 822. Divided and this application filed February 18, 1927. Serial No. 169,272.

This invention relates to improvements in corn poppers and similar devices and has for its object the provision of a simply constructed device of this character which is strong and capable of long use without destruction and distortion and is convenient to manipulate and operate. This application is a division of my application filed January 6, 1925, Serial No. 822, which eventuated in Patent No. 1,638,493, August 9, 1927.

To the accomplishment of the foregoing and such other objects as may hereinafter appear, this invention consists in the construction, combination and arrangement of parts hereinafter described and then sought to be defined in the appended claims, reference being had to the accompanying drawings forming a part hereof and which show, merely for the purpose of illustrative disclosure, a preferred embodiment of my invention, it being expressly understood, however, that various changes may be made in practice within the scope of the claims without digressing from my inventive idea.

In the drawings—

Figure 1 represents a general perspective view of a device constructed according to my invention and disclosing one form of the same.

Figure 2 is a cross section taken substantially on line 2—2 of Figure 1.

Figure 3 is an enlarged plan view of the operating member and the part of the cover construction where it joins the operating member.

Figure 4 is a top plan view of another form of cover and operating handle construction.

Figure 5 is a transverse cross section on line 5—5 of Figure 4.

Figure 6 is a transverse cross section on line 6—6 of Figure 4.

Figure 7 is a top plan view of another form of cover and operating handle construction.

Figure 8 is a transverse section on line 8—8 of Figure 7.

Figure 9 is an end elevation of the operating handle construction, the view being taken from the right-hand end of Figure 7.

Referring first to Figures 1, 2 and 3 the numeral 1 designates the main frame member of the device which is in the form of a rectangular loop having rounded corners as indicated at 2. This frame member has its two free end portions of considerable length extending parallel to each other to form the handle 3, which has the gripping member 4 secured to the extremity thereof. This frame and handle member are preferably formed in one piece and of wire of proper dimensions and suitable stiffness and rigidity and also flexibility. The handle 3 is of sufficient length for the purposes of manipulation and operation and being formed of two strands of wire in engagement with each other, would be of sufficient strength to hold the basket or receptacle. This basket or receptacle 5 is formed of woven wire or other reticulated or perforated material which has its edges curled or turned about the frame part 2 as at 6.

The cover or lid for the basket or receptacle is formed by means of the frame 7 which is in the form of a rectangular loop similarly shaped to the frame part 2 previously described and having the rounded corners 8. This frame has the wire cloth 9 or other suitable reticulated or perforated material secured thereto by curling or turning its edges therearound or by welding or similar means.

The operating handle for the lid or cover is preferably formed integrally with the frame for the lid or cover and in the form shown in Figure 1, one end of the wire member of this frame terminates at 10, while the other free end portion 11 is extended to form the operating handle itself. This portion 11 is formed with the loop or eye 12 near the beginning of the frame and is then extended in a substantially straight line to a point near its extremity where it is formed with a second loop or eye 13 and terminates in a laterally extending member 14. These loops or eyes 12 and 13 form means to slidably receive the handle 3, which therefore slidably supports the operating handle as a whole and the lid or cover. The end portion 11 as a whole fits between the two parallel portions of handle 3 and is, therefore, properly supported in position. The lateral extension 14 provides means for manipulating the lid or cover. The loop 13 provides a stop to limit the opening or rearward movement of the lid or cover and the loop 12 provides a stop to limit the closing movement of the lid or cover.

In Figure 4 of the drawing a modification of the lid and operating handle construction is illustrated. In this construction the frame for the lid or cover and the operating handle is formed of thin sheet metal 15 and is shaped to provide the frame part 16 for the lid or cover 17 and also the operating handle part 18. This lid or cover is substantially rectangular in shape to fit over and cover the basket or receptacle. This sheet metal frame part 15 is first rolled into a U-shape for its entire length and the material forming the cover or lid 17 is clamped as at 19 (Figure 5) within the compressed sheet metal frame part. The two parts of the frame member 16 forming the operating handle part 18 of this construction are curved or bent around the two wire members which form the handle 3 of the main frame construction, as indicated in Figure 6 of the drawing. The extremity of each of these members is bent laterally as at 20 to form manipulating means one on each side of the handle construction.

Figures 7, 8 and 9 illustrate another form of device in which the frame for the lid or cover and the operating handle is formed of the wire 21 bent in substantially rectangular shape with rounded corners as at 22 to receive the lid or cover material 23. The end portions of this frame member 21 are extended parallel to each other and coiled as at 24 to provide an extended guideway or conduit to receive the parallel members of the handle 3 of the main frame. The extremity of each of these frame members 24 is bent laterally as at 25 to form manipulating and operating means.

It is understood that in each of these constructions the parts are bent where necessary at the junction between the operating handle and the lid or cover so as to permit the lid or cover to move and assume a tight position relative to the basket or receptacle.

What I claim is:—

1. A device of the character described including, in combination, a basket or receptacle having a handle attached thereto, a lid or cover for said basket or receptacle including a one piece member forming a marginal frame for the lid or cover extending around the edges thereof and having an operating member, said operating member extending along said handle and being formed with means to slidably engage said handle.

2. A device of the character described including, in combination, a basket or receptacle having a handle attached thereto, a lid or cover for said basket or receptacle including a one piece member forming a marginal frame for the lid or cover extending around the edges thereof and having an operating member, said operating member extending along said handle and being formed with a loop near the lid or cover and another loop near its extremity, with a straight portion therebetween, said loops being adapted to slidably receive said handle.

3. A device of the character described including, in combination, a basket or receptacle having a handle attached thereto, a lid or cover for said basket or receptacle including a one piece member forming a marginal frame for the lid or cover extending around the edges thereof and having an operating member, said operating member extending along said handle and being formed with a loop near the lid or cover and another loop near its extremity, with a straight portion therebetween, said loops being adapted to slidably receive said handle, said loops also forming abutments to limit the movement of said operating member in each direction.

4. A device of the character described including, in combination, a basket or receptacle having a handle attached thereto, a lid or cover for said basket or receptacle including a one piece member forming a marginal frame for the lid or cover extending around the edges thereof and having an operating member, said operating member extending along said handle and being formed with a loop near the lid or cover and another loop near its extremity, with a straight portion therebetween, said loops being adapted to slidably receive said handle, said last-mentioned loop terminating in a laterally extended portion to form manipulating means.

5. A device of the character described including, in combination, a basket or receptacle having a handle attached thereto, a lid or cover for said basket or receptacle including a one piece member forming a marginal frame for the lid or cover extending around the edges thereof and having an operating member, said operating member extending along said handle and being shaped so as to slidably receive and engage said handle.

6. A device of the character described including, in combination, a basket or receptacle having a handle attached thereto, a lid or cover for said basket or receptacle including a one piece member forming a marginal frame for the lid or cover extending around the edges thereof and extended to provide an operating member, said operating member extending along said handle, said one piece member being formed of sheet metal bent to hold the material of the lid or cover and the part of the one piece frame member forming the operating member being bent to form extended guideways to receive said handle.

7. A device of the character described including, in combination, a basket or receptacle having a handle attached thereto, a lid or cover for said basket or receptacle including a one piece member forming a marginal frame for the lid or cover extending around the edges thereof and having an operating member, said operating member extending along said member, said operating handle being formed to provide extended guideways to slidably receive a substantial length of said handle.

8. A device of the character described including, in combination, a basket or receptacle having a handle attached thereto, a lid or cover for said basket or receptacle including a one piece member forming a marginal frame for the lid or cover extending around the edges thereof and having an operating member, said operating member extending along said member, said operating handle being formed to provide a pair of long guideways extending parallel with each other to receive a substantial length of said handle.

9. A device of the character described including, in combination, a basket or receptacle having a handle attached thereto, a lid or cover for said basket or receptacle including a one piece member forming a marginal frame for the lid or cover extending around the edges thereof and having an operating member, said operating member extending along said member, said operating handle being formed to provide a pair of long guideways extending parallel with each other to receive a substantial length of said handle and formed at one end with laterally extending members to provide manipulating means.

10. A device of the character described including, in combination, a basket or receptacle having a handle attached thereto, a lid or cover for said basket or receptacle including a one piece member forming a marginal frame for the lid or cover extending around the edges thereof and having an operating member, said operating member being formed of a plurality of convolutions within which said handle is slidably received.

11. A device of the character described including, in combination, a basket or receptacle having a handle connected thereto, a lid or cover for said basket or receptacle including a marginal frame member extending around the edges thereof and then extended endwise therefrom along said handle to form an operating member, said operating member being formed with a plurality of means to slidably engage said handle.

12. A device of the character described, including in combination, a basket or receptacle having an elongated handle extending therefrom, a lid or cover for said basket or receptacle, said lid or cover including a marginal frame member extending around the edges thereof, and then extended endwise therefrom along said handle to form an operating member, said operating member being formed with loop portions to slidably receive said handle, whereby said lid or cover is slidably mounted with reference to said basket or receptacle.

13. A device of the character described including, in combination, a basket or receptacle having an elongated handle attached thereto, a lid or cover for said basket or receptacle, said lid or cover including a marginal frame member extending around the edges thereof and then extended endwise therefrom along said handle to form an operating member, said operating member being formed with loop portions slidably receiving said handle, whereby said lid or cover is slidable with reference to the basket or receptacle.

In testimony that I claim the foregoing, I have hereunto set my hand this 11th day of February, 1927.

JOHN G. LE PERE.